United States Patent [19]
Banns

[11] Patent Number: 5,743,454
[45] Date of Patent: Apr. 28, 1998

[54] METHOD AND APPARATUS FOR INSTALLING STAKES IN NETTING FOR GROWING TURF

[75] Inventor: Macky Banns, Pitt Meadows, Canada

[73] Assignee: Highland Redi-Green Turf Farm Ltd., Pitt Meadows, Canada

[21] Appl. No.: 505,646

[22] Filed: Jul. 21, 1995

[51] Int. Cl.$^6$ .............................. B25C 5/02; B25C 5/06; F16B 15/08
[52] U.S. Cl. .................. 227/120; 227/129; 411/442; 411/905
[58] Field of Search ............................ 227/120, 129, 227/130; 405/15; 52/4; 411/442, 443, 444, 487–489, 905

[56] References Cited

U.S. PATENT DOCUMENTS

| | | |
|---|---|---|
| 1,026,050 | 5/1912 | Reber .................................. 411/442 |
| 4,809,849 | 3/1989 | Kozyrski et al. ................. 411/442 X |
| 5,249,893 | 10/1993 | Romanek et al. ................. 405/15 X |

OTHER PUBLICATIONS

1. The prior art technique of using dowels to maintain netting in position on the ground surface or, alternatively, "popsicle sticks" as described on page 2, lines 19–31, of the specification.
2. The prior art technique of manufacturing popsicle sticks uses the technique described in the specification at page 7, lines 11–23.
1. United States Patent 5,025,969 granted Jun. 25, 1991, entitled Dual Actuation Staple Insertion Apparatus, invented by William L. Koester et al.

*Primary Examiner*—Neill R. Wilson
*Attorney, Agent, or Firm*—John Russell Uren

[57] ABSTRACT

A staple for maintaining netting in an installed position on a ground surface, which netting is used to enhance the growing of turf or sod. The staple has a pointed end and a medial portion extending to a distant end. The distant end has a head portion which is of a width that is greater than the width of the pointed end and the medial portion and is likewise wider that the smallest distance defining the opening in the netting. A method and apparatus for installing the staple is also disclosed.

10 Claims, 4 Drawing Sheets

METHOD AND APPARATUS FOR INSTALLING STAKES IN NETTING FOR GROWING TURF

FIELD OF THE INVENTION

This invention relates to a method and apparatus for growing turf and, more particularly, to a method and apparatus for growing turf which utilizes netting and staples for maintaining the netting in its operating position on a ground surface.

BACKGROUND OF THE INVENTION

The use of plastic netting is pervasive in growing turf or sod which can then be moved to a desired growing location and which will then form the desired grass surface. The use of netting strengthens the soil in which the netting is placed since many grasses do not have a well developed root system. It also allows a shortened growing season with the result that more crops can be obtained. Finally, it strengthens the soil so that manhandling the sod or turf does not cause extensive damage that otherwise would be the case.

A continued problem, however, is the installation of the netting on the ground surface on which the grasses are to be grown. This installation is important since the netting must be maintained in position until the grasses have a chance to grow. Wind and precipitation can remove the netting from the soil thus denigrating the advantages otherwise obtainable.

Previously, several techniques have been used to lay the netting, all of which suffer from some disadvantages. In one technique, a very narrow strip of top soil is taken up, the net is positioned on the ground surface and the earth previously removed is deposited on top of the netting so as to hold the netting in position. However, the quantity of soil obtained is dependent on the soil conditions in different locales. Likewise, where the field is uneven, the depth of the soil on the netting may vary from side to side and a portion of the netting may not even be covered by the soil or it can be covered too deeply.

A second technique uses a vibratory type action. The soil on which the netting is installed is vibrated, the intention being to move a portion of the soil over the top of the netting that is installed on the ground and thereby retain it in position. This technique also suffers from disadvantages, such being primarily caused by the many different soil conditions that can exist in various growing areas.

A third and preferred technique is to use stakes to keep the netting in its desired position. The stakes are inserted through openings in the netting manually by kneeling and using a hammer and are inclined in their operating position in an attempt to keep the netting on the ground in the event of wind. The stakes used are in the form of dowelling or "popsicle sticks". This technique has the advantage that the netting is positively held in at least a few locations but the disadvantages are that the stakes do not always prevent the netting from being blown away because of their configuration. Likewise, the manual installation of the stakes is costly, slow and labour intensive.

SUMMARY OF THE INVENTION

According to one aspect of the invention, there is provided a staple used to secure netting placed in operative condition on a ground surface, said staple being generally flat and having a thickness which is small relative to said width, said staple having a first pointed end for assisting entry into said ground surface through said netting, a medial portion extending from said first pointed end to a second end, said second end being in the form of a head portion having a width, said width of said head portion being greater than the width of said first pointed end or said medial portion.

According to a further aspect of the invention, there is provided a plurality of substantial identical staples, each staple being operable to be individually inserted through netting into a ground surface, each of staples being flat and having a relatively small thickness relative to its width, each of said staples having a first pointed end to enter said ground surface and a medial portion extending from said first pointed end to a second head portion, said second head portion having a width that is greater than the width of said first pointed end or said medial portion, each of said staples being operatively connected to adjacent staples thereby to allow for movement of said plurality of staples into a magazine of a staple installation apparatus while each of said staples remains stationary relative to said adjacent staples and further allowing ejection of each individual staple from said plurality of staples by said staple installation apparatus.

According to yet a further aspect of the invention, there is provided staple installer apparatus for installing a staple in netting used to cover a ground surface, said apparatus comprising a magazine for holding a plurality of staples, a slide reciprocal on a frame for moving one of said plurality of staples away from said plurality of staples and installing said staple into said ground surface and through said netting and a handle for manually carrying said apparatus, said slide being biased out of contact with said plurality of staples when said apparatus is in a raised position off said ground surface, said slide being operable to move downwardly into contact with said one of said plurality of staples when said apparatus is in contact with said ground surface.

According to yet a further aspect of the invention, there is provided staple installer apparatus having a frame which is operable to be connected to a ground moving vehicle used to lay netting on a ground surface, said apparatus comprising a foot plate for contacting said ground surface and said netting, a magazine for holding a plurality of staples, a slide for contacting one of said plurality of staples and operatively installing said staple into said ground surface through said netting after said netting has been laid on said ground surface, the operation of said slide being initiated when said foot plate contacts said ground surface, said installer apparatus being rotatable on a frame such that said foot plate remains substantially stationary relative to said netting while said foot plate is in contact with said netting.

According to yet a further aspect of the invention, there is provided a method of making a wooden staple for installation through netting used to cover a ground surface and into said ground surface, said method including the steps of positioning a wooden cylinder in a hot water heating tank for a predetermined period of time to soften said wood, placing said softened wood cylinder in a lathe, rotating said cylinder to continuously remove a thin portion of the surface of said cylinder thereby obtaining an extended longitudinal and rectangular wooden strip, feeding said strip to a stamping machine and stamping out at least one staple from said strip, said staple having a first pointed end and a medial portion extending from said first pointed end to a second end, said second end being defined by a width greater than said first pointed end and said medial portion.

According to yet a further aspect of the invention, there is provided a method for installing a plurality of wooden staples through netting operably installed over a ground surface and into said ground surface, said method comprising laying said netting on said ground surface and inserting said staples into said ground surface through said netting, said staples being generally thin relative to the transverse dimension of said staple, said staple having a first pointed end, a medial portion extending from said first pointed end to a second distant end, said second distant end being defined by a head portion which is wider than said first pointed end and said medial portion.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 3:
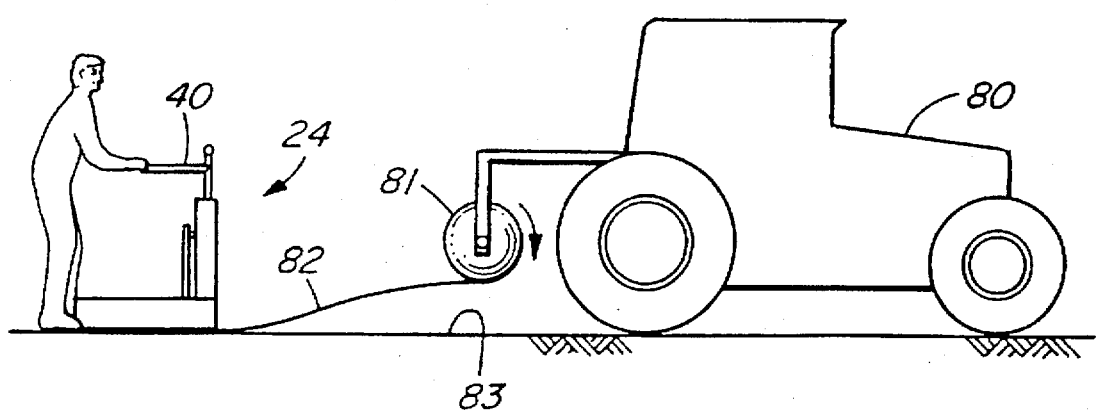
FIG. 3 is a diagrammatic view of the netting installation and the staple insertion method according to the invention.

Reference is now made to the drawings and, in particular, to FIG. 3 which illustrates a tractor 10 used for installing plastic netting 11 which is rear mounted in rolls 12 on the tractor 10. As the tractor 10 moves rightwardly as seen in the figure, the netting 11 is played out and is laid on the ground surface 13.

Figure 1A:
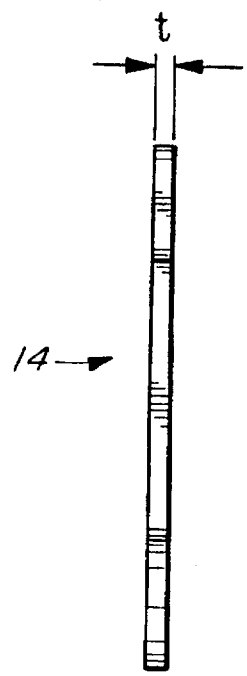
FIGS. 1A and 1B are front and side views, respectively, of a wooden staple according to one aspect of the present invention and used for installation though netting used for ground surface cover and into the ground surface.
Figure 1B:
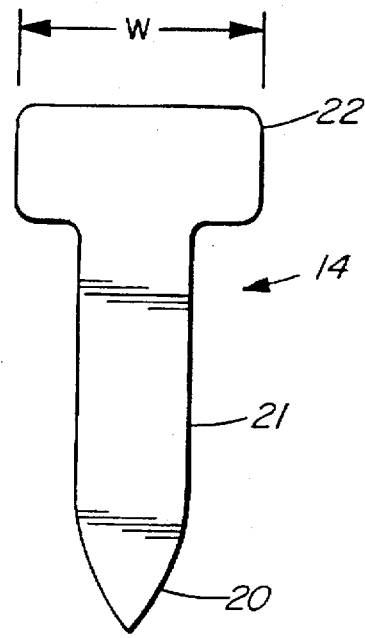

A stake or staple according to the present invention is generally illustrated at 14 in FIG. 1. The staple 14 is made of wood, conveniently birch, alder or maple, and has a first pointed end 20 which is adapted to be inserted through the openings in the netting 11 as will be more specifically described hereafter and into the ground surface 13 (FIG. 3). The first pointed end 20 extends into a medial portion 21 which extends into a second end 22 distant from the first end 20. Second end 22 has a transverse width "w" which is greater than the transverse width of the medial portion 21 or the first pointed end 20. It is also noted that the staple 14 is relatively thin in thickness; that is, the thickness "t" is much smaller than the transverse width "w" as seen in the figures.

Figure 6A:
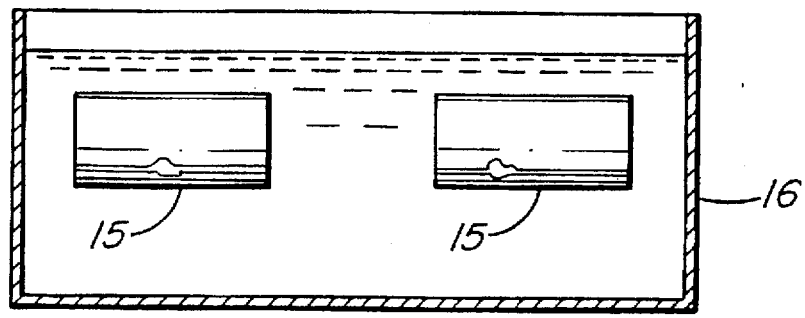
FIGS. 6A, 6B and 6C illustrate the method of making the wooden staples according to a further aspect of the invention.
Figure 6B:
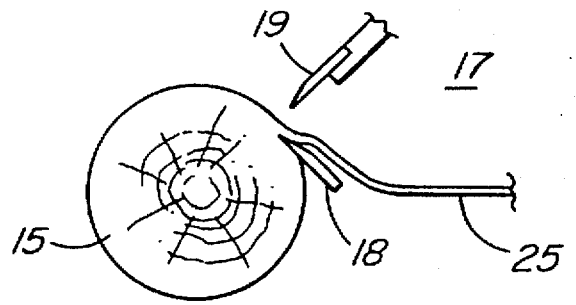
Figure 6C:
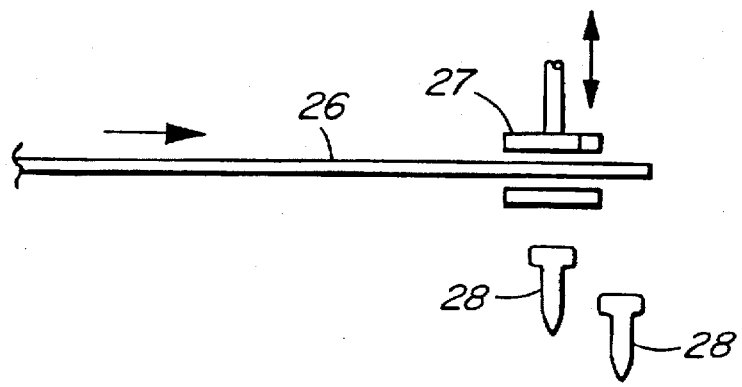

The staple 14 is made from a process similar to a process that is used for manufacturing popsicle sticks and the like. With reference to FIGS. 6A, 6B and 6C, a wood cylinder 15 such as an alder, birch or maple tree trunk is cut to a convenient length and is placed in a heated water tank 16 where it is submerged overnight. The cylinder 15 is then placed in a lathe 17 and rotated. Knives 18, 19 continuously remove a thin strip of wood 25 of a predetermined thickness from the cylinder 15 and cut the strip 25 to a desired width. The removed strip of wood 26 is then inserted into a stamping machine 27 and the staples 28 of the desired configuration are stamped from the wood.

It is desirable to collect a plurality of staples together for use in the installation machines as will be hereafter described. The plurality of staples may be attached to one another by light glue or tape for installation into the machines. All that is required is that each staple my be conveniently detached from the plurality of like staples by the operation of the machines as will be described.

Figure 2:
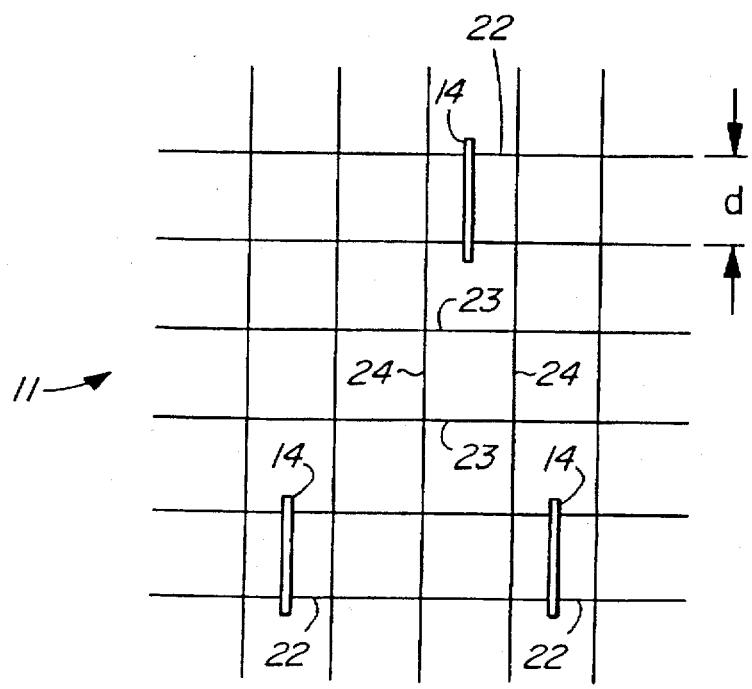
FIG. 2 is a diagrammatic plan view of netting installed on a ground surface with staples according to the present invention being installed through the openings in the netting.

Reference is now made to FIG. 2 which illustrates the installation of several staples 14 in the openings 22 of the netting 11. Each of the openings 22 is rectangular and is defined by strands 23, 24 of the material of the netting 11, strands 23 extending transverse to staple 14 as seen in FIG. 2 and strands 24 being parallel thereto. It will be noted that the transverse width "w" of the second end 22 of staple 14 is greater that the distance "d" between the closermost pair of strands 23.

Figure 4:
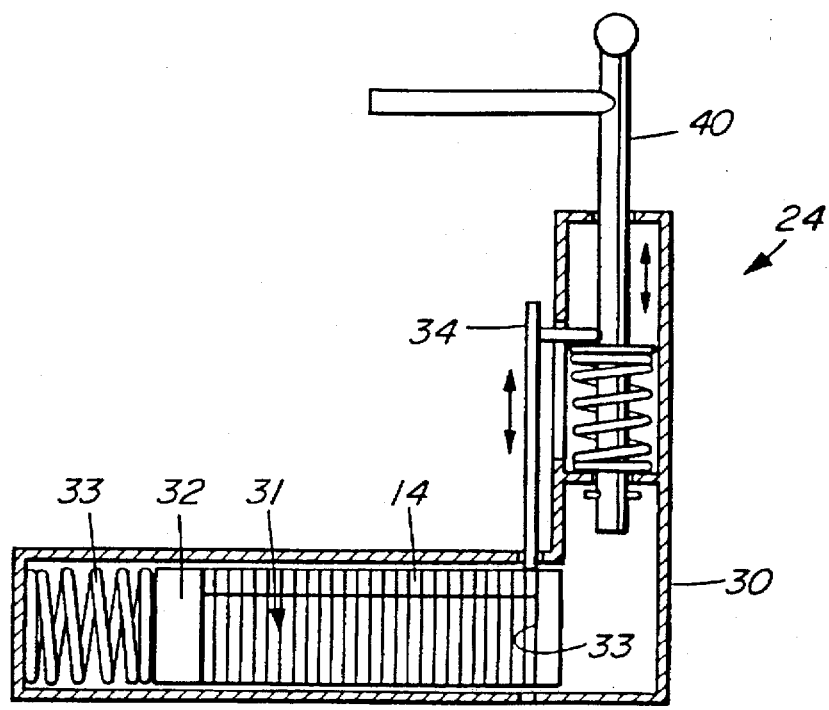
FIG. 4 is a diagrammatic partial cross-sectional view of the staple installation apparatus according to a further aspect of the invention.

The individual operator operated staple installer is illustrated generally at 24 in FIG. 4. A frame 30 contains a magazine 31 for operably installing a plurality of staples 14. A movable block 32 is biased by spring 33 and thereby maintains the plurality of staples 14 in contact with an anvil portion 33 of the frame 30. A slide 34 is reciprocal vertically as seen in the figure and is attached to a handle 40 which is held by an operator. Slide 34 is likewise spring mounted within frame 30 and, when the handle 40 is held such that the frame 30 is out of contact with the ground surface 13, the slide 34 will be out of contact and above the endmost one of the staples 14; that is, the staple nearest to the anvil portion 33.

Figure 5:
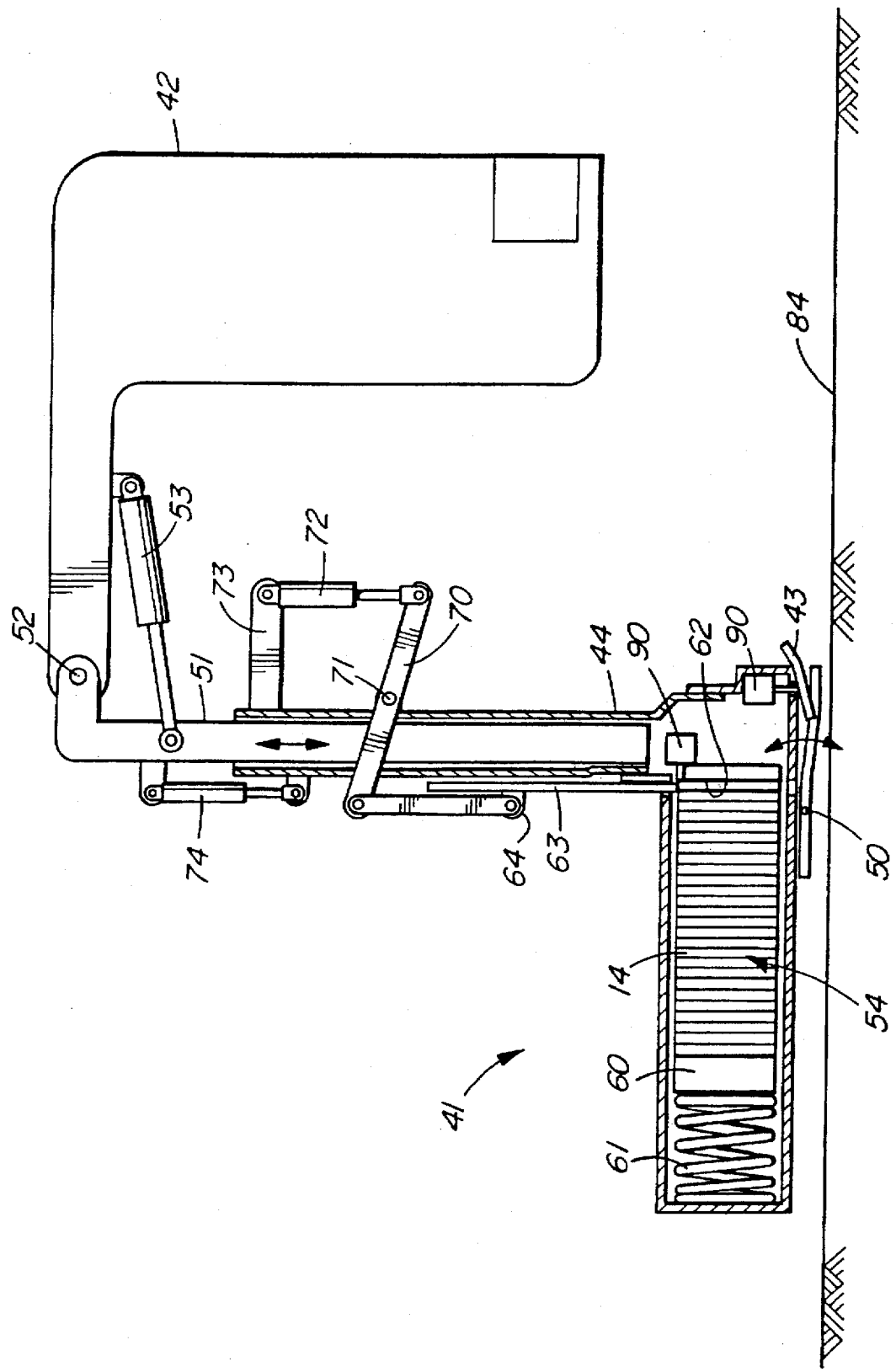
FIG. 5 is a diagrammatic partial cross-sectional view of a staple installation apparatus which is used for mounting on a netting laying tractor and which acts to automatically install the staples using a minimum amount of operator intervention.

With reference now to FIG. 5, an automatic staple installation apparatus is generally illustrated at 41. The apparatus 41 is connected to a frame 42 which is permanently or temporarily installed to a tractor (not illustrated).

Apparatus 41 includes a plurality of solenoids which will be described in more detail hereafter. Each of the solenoids may be individually controlled relative to the remaining solenoids so as to program the various operating steps taken by the apparatus 41 when it is in its operating mode.

A footplate 43 is pivotally connected about axis 50 to a movable subframe 44. Subframe 44 is movable generally vertically relative to an internal support frame 51. Internal support frame 51 is rotatable about axis 52 on frame 42. The rotatable movement of the internal support frame 51 is controlled by a hydraulic cylinder 53 connected between frame 42 and support frame 51. A magazine is generally illustrated at 54 in FIG. 5. The magazine 54 holds a plurality of staples 14 in the same manner as with the embodiment illustrated in FIG. 4. The staples 14 are held in position by a block 60 which is spring biased by spring 61 and movable to hold the staples 14 against the anvil 62. A slide 63 is reciprocal generally vertically relative to the movable subframe 44 and acts to dislodge a single one of the staples 14 from the magazine 54 with each stroke. Slide 63 has a bracket 64 which is connected to a lever 70 pivoting about an axis 71 on the movable subframe 44. A hydraulic cylinder 72 is mounted between the lever 70 and a frame extension 73 on the movable subframe 44. Hydraulic cylinder 72 moves the lever and, thereby, the slide 63.

A hydraulic cylinder 74 is mounted between the movable sub-frame 44 and the support frame 51. Cylinder 74 provides the reciprocal movement of the movable subframe 44 relative to support frame 51.

OPERATION

In operation and with reference to FIG. 3, the tractor 80 will be moving rightwardly as viewed in the drawing and the roll 81 of plastic netting 82 is mounted to allow the netting to be positioned on the ground surface 83. As the netting 82 is placed on the ground surface 83, an operator of the staple installer 24 will follow. He will select the position where a staple 14 is intended to be installed and allow the staple installer 24 to touch the ground surface 83. The operator will apply a downwards pressure on the handle 40 which will thereby move the slide 24 (FIG. 4) downwardly relative to the frame 30 and magazine 31. A single staple 14 will thereby be removed from the magazine 31 and inserted into the ground surface 83 through the holes or openings 22 in the netting 82 thus holding the netting 82 securely in position on the ground surface 83 as seen in FIG. 2.

The use of the automatic installation apparatus 41 as viewed in FIG. 5 operates somewhat differently and reference is made to that figure. The frame 42 is mounted on a tractor (not shown) and the female hydraulic connections from the tractor are connected to the appropriate male connections (not shown) extending from the apparatus 41. As the tractor moves forwardly, cylinder 74 will extend its length and the movable subframe 44 will move downwardly until the footplate 43 contacts the ground surface 84. Footplate 43 is rotatable about axis 50 and as the footplate 43 rotates counterclockwise upon touching the ground surface 84, the operation of solenoid 90 is initiated.

Solenoid 90 controls the operation of cylinder 72 which is immediately operated and acts to drive the slide 63 downwardly thereby to eject a single staple 14 from the magazine 54 through the openings in the netting as previously described. It will be particularly noted that the tractor will continue moving but that since the support frame 51 is rotatable about axis 52, the footplate 43 will remain stationary relative to the netting and ground surface thereby to reduce any friction force between the footplate 43 and the netting which would otherwise tend to disturb the netting.

As the slide 63 reaches its most downwardly position, solenoid 90 is contacted and immediately instructs cylinder 74 to retract and raise the footplate 43 and frame 44 off the netting and ground surface 84 and likewise instructs cylinder 53 to retract and rotate the support frame 51 counterclockwise relative to frame 42 thereby to return to its original operating position and ready for the next staple injection.

Many changes in the apparatus and methods described will readily occur to those skilled in the art to which the invention relates and the embodiments set out herein should be taken as illustrative of the invention only and not as limiting is scope as defined by the accompanying claims.

What is claimed is:

1. Stake installer apparatus having a frame which is operable to be connected to a ground moving vehicle used to lay netting on a ground surface, said apparatus comprising a foot plate for contacting said ground surface and said netting, a magazine for holding a plurality of stakes, a slide for contacting one of said plurality of stakes and operatively installing said stake into said ground surface through said netting after said netting has been laid on said ground surface, the operation of said slide being initiated when said foot plate contacts said ground surface, said installer apparatus being rotatable on a frame such that said foot plate remains substantially stationary relative to said netting while said foot plate is in contact with said netting.

2. Stake installer apparatus as in claim 1 wherein said stake is installed through openings in said netting.

3. Stake installer apparatus for installing a stake in netting used to cover a ground surface, said apparatus comprising a magazine for holding a plurality of stakes, a slide reciprocal on a frame for moving one of said plurality of stakes away from said plurality of stakes and installing said stake into said ground surface and through said netting and a handle for manually carrying said apparatus, said slide being biased out of contact with said plurality of stakes when said apparatus is in a raised position off said ground surface, said slide being operable to move downwardly into contact with said one of said plurality of stakes when said apparatus is in contact with said ground surface.

4. Stake installer apparatus as in claim 3 and further comprising a plurality of stakes to secure netting, each of said stakes being generally flat and having a thickness which is small relative to said width, each of said stakes having a first pointed end for assisting entry into said ground surface through said netting and a medial portion extending from said first pointed end to a second end, said second end being in the form of a head portion having a width, said width of said head portion being greater than the width of said first pointed end or said medial portion.

5. Stake installer apparatus as in claim 4 wherein said netting has a plurality of openings, each being defined by strands of said netting, said head portion having a width which is greater than the shortest distance between the strands of said netting defining each of said openings.

6. Stake installer apparatus as in claim 5 wherein said stake is made from wooden material.

7. Stake installer apparatus as in claim 6 wherein said wooden material is alder, birch or maple.

8. Stake installing apparatus as in claim 3 wherein said plurality of stakes are substantially identical, each stake staple being operable to be individually inserted through said netting into said ground surface, each of said stakes being flat and having a relatively small thickness relative to its width, each of said stakes having a first pointed end to enter said ground surface and a medial portion extending from said first pointed end to a second head portion, said second head portion having a width that is greater than the width of said first pointed end or said medial portion, each of said stakes being operatively connected to adjacent stakes thereby to allow for movement of said plurality of stakes into said stake installation apparatus while each of said stakes remains stationary relative to said adjacent stakes and further allowing ejection of each individual stake from said plurality of stakes by said stake installation apparatus.

9. Stake installer apparatus as in claim 8 wherein each of said stakes is operatively connected to said adjacent stakes by tape wrapped about said plurality of stakes.

10. Stake installer apparatus as in claim 8 wherein each of said stakes is operatively connected to said adjacent stakes by releasable glue.

* * * * *